J. H. BANCROFT.
HOT EGG OPENER AND HOLDER.
APPLICATION FILED JAN. 10, 1907.
900,908.
Patented Oct. 13, 1908.
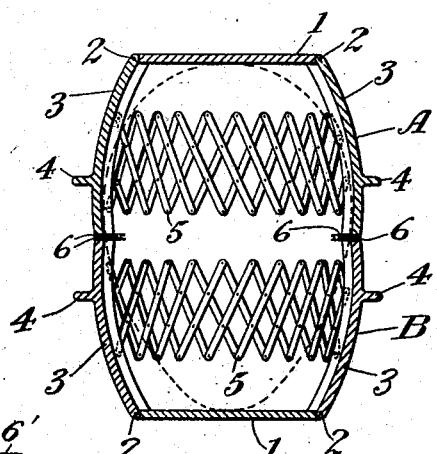
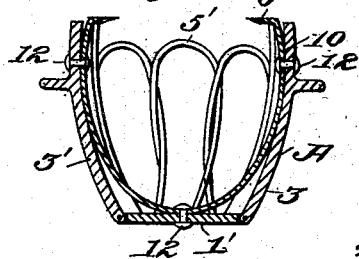
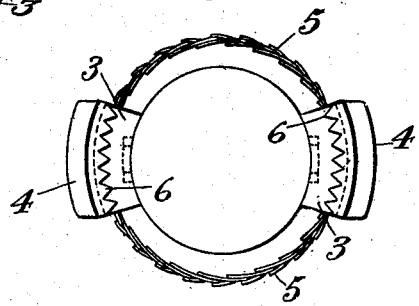
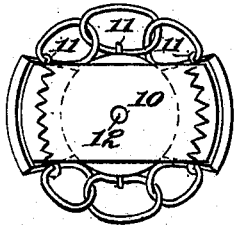
Witnesses:
Chas. D. King,
W. H. Crichton-Clarke
Inventor:
Jessie H. Bancroft
by Dunn & Turk
Attys.

UNITED STATES PATENT OFFICE.

JESSIE H. BANCROFT, OF NEW YORK, N. Y.

HOT-EGG OPENER AND HOLDER.

No. 900,908.　　　　Specification of Letters Patent.　　　　Patented Oct. 13, 1908.

Application filed January 10, 1907. Serial No. 351,587.

*To all whom it may concern:*

Be it known that I, JESSIE H. BANCROFT, a citizen of the United States, residing in New York city, borough of Manhattan, county of New York, and State of New York, have invented certain new and useful Improvements in a Combined Hot-Egg Opener and Holder, of which the following is a full, clear, and exact specification.

This invention relates to a combined hot egg opener and holder.

It is well known that difficulty is frequently experienced in opening and holding a hot egg, particularly when it has been soft-boiled.

The object of the present invention is to effect in a simple, practical, and thoroughly efficient manner the operation of opening and holding a hot egg.

With the foregoing and other objects in view, which will appear as the description proceeds, the invention resides in the combinations and arrangements of parts and in the details of construction hereinafter described and claimed, it being understood that changes in the precise embodiment of invention herein disclosed can be made within the scope of the following claims without departing from the spirit of the invention, or sacrificing any of its advantages.

In the accompanying drawing forming part of this specification, Figure 1 is a vertical section through a hot egg opener and holder comprising a pair of detached compressible cups constructed in accordance with the present invention. Fig. 2 is a plan view of one of the compressible cups. Fig. 3 is a sectional view through a modified form of egg cup. Fig. 4 is a plan view of the construction illustrated in Fig. 3.

Like reference numerals indicate corresponding parts in the two figures of the drawing.

The hot egg opener of the present invention preferably comprises a pair of detached cups which are indicated generally by reference letters A and B. As the two cups A and B are similar in construction, a specific description of one will suffice to convey an understanding of both.

Each of the cups A and B preferably is not only compressible in its nature, but is provided with egg-penetrating means which incidentally are adapted to hold the cup in compressed condition, handles for use in grasping the cup, and a supporting base of any suitable character whereby both of the cups can be separated from each other and placed upright upon a table, so that each of the cups will hold a portion of the egg which has been opened.

The supporting base of each of the compressible cups is indicated by the reference numeral 1. This supporting base 1 preferably is in the form of a flat end piece which is adapted to hold the compressible cup in upright position. Pivotally connected in any suitable manner with the supporting base 1 of each cup as indicated at 2, is a plurality of movable sections 3, each of which is provided with any suitable form of handle 4. Extending between the movable sections 3, are flexible connections 5, which preferably are in the form of lazy tongs or toggle connections in annular form as shown in Fig. 2, whereby the movable sections 3 can be moved toward or away from each other to compress or expand the cup.

The egg-penetrating means with which the cups are provided preferably consist of cutters 6, which are secured to the upper ends of the movable sections 3 in any suitable manner. The cutters or egg-penetrating means 6 preferably are serrated along their cutting edges as indicated in Fig. 2.

Constructed as described, the improved device preferably is used in the following manner: The compressible cups A and B are separated from each other and a hot egg is placed in one of the cups in any suitable manner, such as by means of a spoon or napkin. The insertion of the egg into the cup causes the same to expand. The other cup is then fitted over the end of the egg which protrudes from the first-mentioned cup, and one or both of the cups can then be compressed by pressure upon the movable sections 3 so as to cause the cutters or egg-penetrating means 6 to enter the egg adjacent the center thereof. By suitably manipulating the cups and drawing them apart, the egg can be separated into two halves. The two compressible cups A and B can then be placed in upright position upon a table with one half of the egg in each of the cups. The contents of the different portions of the egg can be removed therefrom while they are held in the compressible cups.

It is found, in using the improved egg opener of this invention, that the engagement of the cutters or egg-penetrating means 6 with the upper edge of a portion of the egg-shell will serve effectually to hold the compressible cup in compressed condition. Furthermore, it is desirable that the joints or pivot points of the toggle levers which are used as the flexible connections between the sections 3 be sufficiently tight to stiffen the toggle connections and thus produce a certain amount of friction, which will cause the cup to remain in any condition to which it has been adjusted. In this way, by using comparatively stiff or frictional joints in the toggle levers, each of the cups A and B, when it has been compressed around a portion of an egg, will remain in such compressed condition until the sections thereof are drawn apart to expand the cup.

In the modified construction illustrated in Figs. 3 and 4, the egg-penetrating means or movable cutters 6 are secured to or formed integral with the upper ends of an approximately U-shaped spring 10, which is mounted inside the compressible cup and constitutes automatic means for expanding the cup. The flexible connection between the movable section 3' preferably consists of wire loops 5', which are twisted together as shown in Fig. 3, and are secured to the movable sections 3' and supporting base 1 in any suitable manner, such as by means of the small U-shaped staples 11. The supporting base 1' and movable sections 3' are riveted or otherwise secured to the spring 10, as indicated at 12. The movable sections 3' are pivoted to the supporting base 1, as indicated.

Having thus described my invention, what I claim and desire to secure by Letters Patent is:

1. A hot egg opener consisting of a holder having a base, supporting walls movably secured to said base and provided with penetrating devices at the ends thereof, and intermediate extensible egg-inclosing means connecting the adjacent sides of said walls.

2. A hot egg opener comprising a supporting base, an approximately U-shaped spring secured at its center to said supporting base and having integral penetrating devices at its upper ends, and side members pivotally connected with said supporting base at their lower ends, and secured at their upper ends to said U-shaped spring, substantially as described.

In testimony whereof, I have hereunto set my hand in the presence of two subscribing witnesses.

JESSIE H. BANCROFT.

Witnesses:
 HENRIETTA E. WORKMAN,
 W. H. CRICHTON-CLARKE.